US009367180B2

(12) United States Patent
    Mi

(10) Patent No.: US 9,367,180 B2
(45) Date of Patent: Jun. 14, 2016

(54) PROJECTED CAPACITIVE TOUCH PANEL

(75) Inventor: David Mi, Pingzhen (TW)

(73) Assignee: MASTOUCH OPTOELECTRONICS TECHNOLOGIES CO., LTD., Taoyuan (TW)

( * ) Notice: Subject to any disclaimer, the term of this patent is extended or adjusted under 35 U.S.C. 154(b) by 509 days.

(21) Appl. No.: 12/923,659

(22) Filed: Oct. 1, 2010

(65) Prior Publication Data

US 2012/0038560 A1    Feb. 16, 2012

(30) Foreign Application Priority Data

Aug. 13, 2010   (TW) .............................. 99215531 U

(51) Int. Cl.
*G06F 3/044* (2006.01)
(52) U.S. Cl.
CPC ...................................... *G06F 3/044* (2013.01)
(58) Field of Classification Search
CPC ....................................................... G06F 3/044
USPC ................................................. 345/173–174
See application file for complete search history.

(56) References Cited

U.S. PATENT DOCUMENTS

| 2008/0007534 A1* | 1/2008 | Peng et al. ..................... 345/173 |
| 2008/0158181 A1* | 7/2008 | Hamblin et al. ............... 345/173 |
| 2011/0032193 A1* | 2/2011 | Szalkowski .................... 345/173 |
| 2011/0128235 A1* | 6/2011 | Rogers et al. .................. 345/173 |
| 2011/0210924 A1* | 9/2011 | Yang et al. ..................... 345/173 |
| 2011/0254803 A1* | 10/2011 | Chae et al. ..................... 345/174 |
| 2011/0267304 A1* | 11/2011 | Simmons et al. .............. 345/174 |

* cited by examiner

*Primary Examiner* — Dwayne Bost
*Assistant Examiner* — Christopher Kohlman
(74) *Attorney, Agent, or Firm* — Gokalp Bayramoglu

(57) ABSTRACT

A projected capacitive touch panel has a substrate, an X-axis electrode layer formed on a top of the substrate and a Y-axis electrode layer formed on a bottom of the substrate. The X-axis and the Y-axis electrode layers respectively have a plurality of X-axis electrodes and Y-axis electrodes arranged in a matrix form and respectively connected with a plurality of X-axis and Y-axis signal transmission lines. Each of the X-axis signal transmission lines and the Y-axis signal transmission lines is connected with a conversion module. The conversion modules is mounted to be adjacent to the X-axis and Y-axis signal transmission lines, converts analog signals into relatively stable digital signals, and transmits the digital signals to an external controller to determine coordinates being touch. Accordingly, lengths of the X-axis and Y-axis signal transmission lines can be shortened and the size of a control area of the touch panel can be enlarged.

20 Claims, 9 Drawing Sheets

PROJECTED CAPACITIVE TOUCH PANEL

BACKGROUND OF THE INVENTION

1. Field of the Invention

The present invention relates to a touch panel, and more particularly to a projected capacitive touch panel effectively enlarging the size of the touch panel and preventing signal transmission lines thereon in the X and Y directions from being overlong.

2. Description of the Related Art

Current touch panels are classified as capacitive touch panels and resistive touch panels. For sake of lower cost, the resistive touch panels have larger market share of all sorts of touch panels. Since Apple's iPHONE emergence to the touch panel market, in addition to the wide range of touch control, the multi-point touch function has become one of the best selling points. However, the multi-point touch feature originates from the projected capacitive touch panels, which also pertain to one type of capacitive touch panels.

With reference to FIG. 6, a conventional projected capacitive touch panel has a substrate 70, an X-axis electrode layer 71 and a Y-axis electrode layer 72. The substrate 70 is transparent and has a top and a bottom. The X-axis electrode layer 71 is mounted on the top of the substrate 70 and has a plurality of X-axis electrodes 711. With reference to FIG. 7, the X-axis electrodes 711 are rhombic and align in a matrix form. The X-axis electrodes 711 on a same row are mutually connected, and the X-axis electrode 711 located on one end of each row is further connected with an X-axis signal transmission line 712. The Y-axis electrode layer 72 is mounted on the bottom of the substrate 70 and has a plurality of Y-axis electrodes 721. The Y-axis electrodes 721 are rhombic, align in a matrix form and alternately and crossly intersect with the X-axis electrodes 711. The Y axis electrodes 721 on a same column are mutually connected, and the Y-axis electrode 721 located on one end of each column is further connected with a Y-axis signal transmission line 722.

The X-axis signal transmission lines 712 and the Y-axis signal transmission lines 722 are normally mounted on the substrate and alongside a side of the substrate 70 and are concentrated and connected with a flexible printed circuit board (PCB). The wires on the flexible PCB are further connected with a control circuit.

With reference to FIG. 8, a touch panel 80 of a regular smart phone is shown. The touch panel 80 has a plurality of X-axis signal transmission lines and a plurality of Y-signal transmission lines. The X-axis signal transmission lines and the Y-axis signal transmission lines are concentrated on a place adjacent to a side of the touch panel 80 and are connected with a flexible PCB 81. The flexible PCB 81 has an analog-to-digital (A/D) converter 82 and a controller 83 mounted on the flexible PCB by a chip on flexible printed circuit (COF) technique. The A/D converter 82 has a plurality of input terminals respectively connected with the X-axis signal transmission lines and the Y-axis signal transmission lines through wires on the flexible PCB 81 to convert analog signals sent from the X-axis signal transmission lines and the Y-axis signal transmission lines into digital signals and further transmit the digital signals to a controller 83. The controller 83 determines x and y coordinates being touched on the touch panel 80.

With reference to FIG. 9, a touch panel that is slightly larger has a plurality of X-axis signal transmission lines and a plurality of Y-axis signal transmission lines concentrated on a lower portion of the touch panel 90, connected with two flexible PCBs and electrically connected with a PCB 93 through the two flexible PCBs 91, 92. The PCB 93 has at least one A/D converter and a controller. The at least one A/D converter is respectively connected with the X-axis signal transmission lines and Y-axis signal transmission lines through the flexible PCBs 91, 92, converts received analog signals into digital signals and sends the digital signal to the controller. The controller computes and determines X and Y coordinates touched on the touch panel in accordance with the received digital signals.

The A/D converter and the controller of the conventional projected capacitive touch panels are mounted to be adjacent to proximal ends of the X-axis signal transmission lines and the Y-axis signal transmission lines. For a compact projected capacitive touch panel, such approach impacts little upon signal stability of the X-axis signal transmission lines and the Y-axis signal transmission lines. However, for a large projected capacitive touch panel, the X-axis signal transmission lines and the Y-axis signal transmission lines must be commonly connected to a circuit board. As a result, the X-axis signal transmission lines and the Y-axis signal transmission lines illustrated in FIG. 8. must be routed and concentrated on one side of the side frame of the touch panel, meaning that the larger the size of the touch panel is, the longer the X-axis signal transmission lines and the Y-axis signal transmission lines are. Usually, the longer the signal transmission distance is, the lower the capability against interference is. Furthermore, as the X-axis signal transmission lines and the Y-axis signal transmission lines must be commonly connected to a circuit board and concentrated on one side of the touch panel, the width of the side frame of the touch panel for accommodating the layout of the X-axis signal transmission lines and the Y-axis signal transmission lines cannot be reduced. Such issue becomes an obstacle in further enlarging the size of a projected capacitive touch panel.

To sum up, the size of conventional projected capacitive touch panels fails to be significantly enlarged due to the limitations of the lengths and wiring layout of the X-axis signal transmission lines and the Y-axis signal transmission lines. A feasible solution needs to be addressed to refine the aforementioned issue.

SUMMARY OF THE INVENTION

An objective of the present invention is to provide a projected capacitive touch panel preventing signal transmission lines thereon in the X and Y directions from being overlong and from being prone to interference due to long wiring length, and effectively enlarging the size of the touch panel.

To achieve the foregoing objective, the projected capacitive touch panel has a substrate, an X-axis electrode layer, a Y-axis electrode layer, at least one X-axis conversion module and at least one Y-axis conversion module.

The substrate is transparent and has a top, a bottom and four sides.

The X-axis electrode layer is formed on the top of the substrate and has a plurality of X-axis signal transmission lines formed on the substrate and being adjacent to one of the four sides.

The Y-axis electrode layer is formed on the bottom of the substrate and has a plurality of Y-axis signal transmission lines formed on the substrate and being adjacent to one of the four sides.

The at least one X-axis conversion module is electrically connected with the X-axis signal transmission lines. Each one of the at least one X-axis conversion module has an X-axis flexible printed circuit board and at least one X-axis analog-to-digital converter. The at least one X-axis analog-to-digital converter is mounted on the X-axis flexible printed circuit board, is connected with the X-axis signal transmission lines, converts analog signals transmitted from the X-axis signal transmission lines to digital signals and outputs the digital signals. Each one of the at least one X-axis analog-to-digital converter has an input terminal and an output terminal.

The at least one Y-axis conversion module is electrically connected with the Y-axis signal transmission lines and has a Y-axis flexible printed circuit board and at least one Y-axis analog-to-digital converter. The at least one Y-axis analog-to-digital converter is mounted on the Y-axis flexible printed circuit board, is connected with the Y-axis signal transmission lines, converts analog signals transmitted from the Y-axis signal transmission lines to digital signals and outputs the digital signals. Each one of the at least one Y-axis analog-to-digital converter has an input terminal and an output terminal.

The X-axis conversion module and the Y-axis conversion module can be mounted to be adjacent to and further respectively connected with the X-axis signal transmission lines and the Y-axis signal transmission lines. As the wiring lengths of the X-axis signal transmission lines and the Y-axis signal transmission lines are shortened, the digital signal converted from the analog signals transmitted through the X-axis signal transmission lines and the Y-axis signal transmission lines by the conversion modules incur less interference and are relatively stable. Besides, due to the shortened signal transmission lines, the area for touch control or the size of the touch panel can be further increased.

To achieve the foregoing objective, in addition to all the components in the first solution, the projected capacitive touch panel further has a distal control module.

The distal control module is connected to the at least one X-axis conversion module and the Y-axis conversion module through a transmission cable, and has a controller for receiving the digital signals outputted from the at least one X-axis conversion module and the at least one Y-axis conversion module, computing and determining coordinate data from the digital signals, and outputting the coordinate data.

Aside from all the features in the first solution, the distal control module is provided to connect with the X-axis conversion module and the Y-axis conversion module so as to receive the digital data therefrom. Since the digital data converted by the X-axis conversion module and the Y-axis conversion module are relatively stable, the data processed by the control module are also stable.

Other objectives, advantages and novel features of the invention will become more apparent from the following detailed description when taken in conjunction with the accompanying drawings.

DETAILED DESCRIPTION OF THE INVENTION

Figure 1:
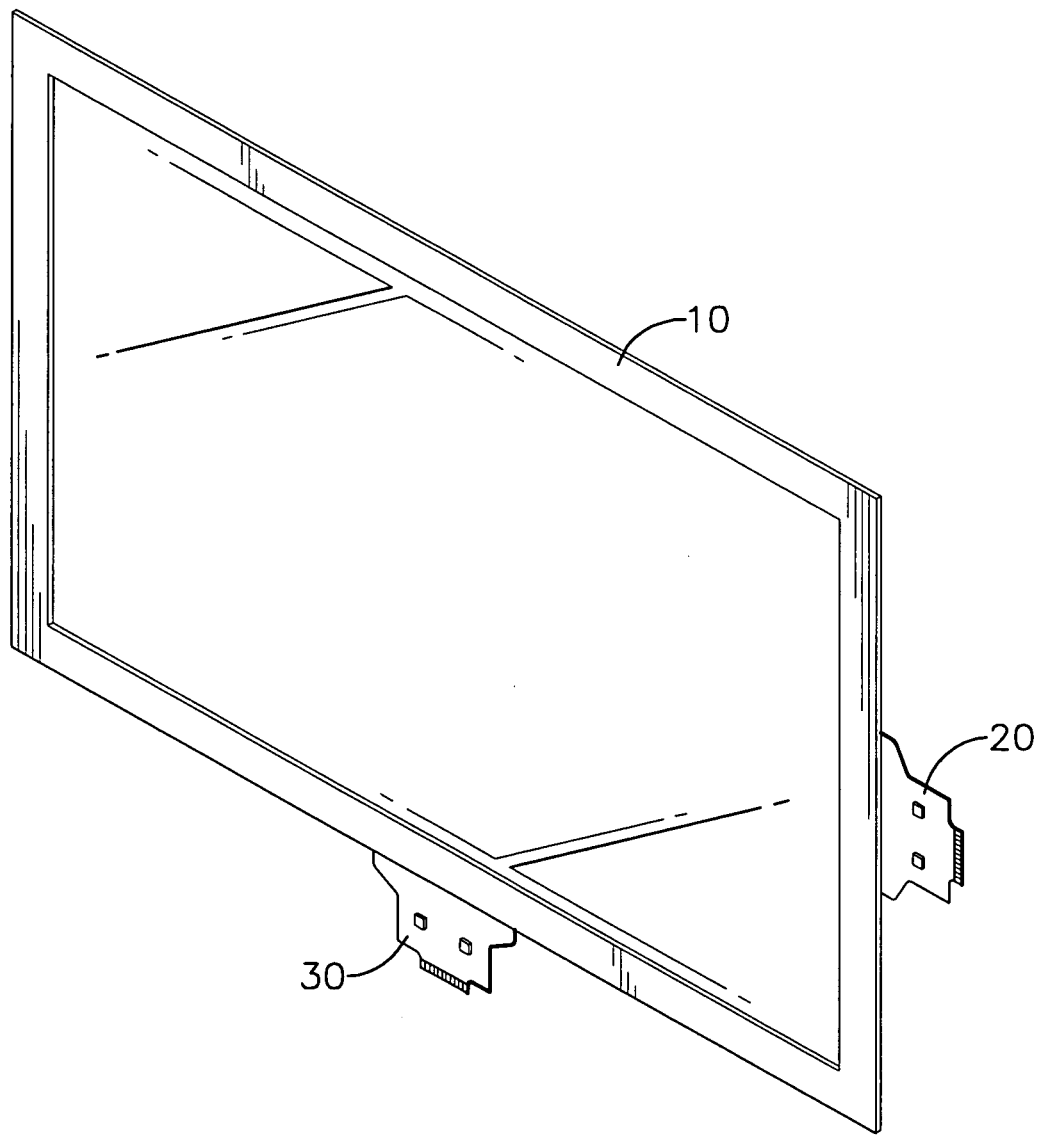
FIG. 1 is a perspective view of a first embodiment of a projected capacitive touch panel in accordance with the present invention.

With reference to FIG. 1, a first embodiment of a touch panel 10 is rectangular and has a substrate, an X-axis electrode layer, a Y-axis electrode layer, an X-axis conversion module 20 and a Y-axis conversion module 30.

In the present embodiment, the touch panel is a projected capacitive touch panel. The substrate has a top, a bottom, two short sides and two long sides. The X-axis electrode layer is mounted on the top of the substrate and has a plurality of X-axis signal transmission lines and a plurality of X-axis electrodes. The X-axis signal transmission lines are formed on the substrate and are adjacent to one of the short sides of the substrate. The X-axis electrodes are arranged as a matrix. The X-axis electrodes on each row of the X-axis electrodes are mutually connected. The X-axis electrode located on one end of the row is further connected with an X-axis signal transmission line. The Y-axis electrode layer is mounted on the bottom of the substrate and has a plurality of Y-axis signal transmission lines and a plurality of Y-axis electrodes. The Y-axis signal transmission lines are formed on the substrate and are adjacent to one of the long sides of the substrate. The Y-axis electrodes are arranged as a matrix and alternately and crossly intersecting with the X-axis electrodes. The Y-axis electrodes on each row of the Y-axis electrodes are mutually connected. The Y-axis electrode located on one end of the row is further connected with a Y-axis signal transmission line.

Figure 2:
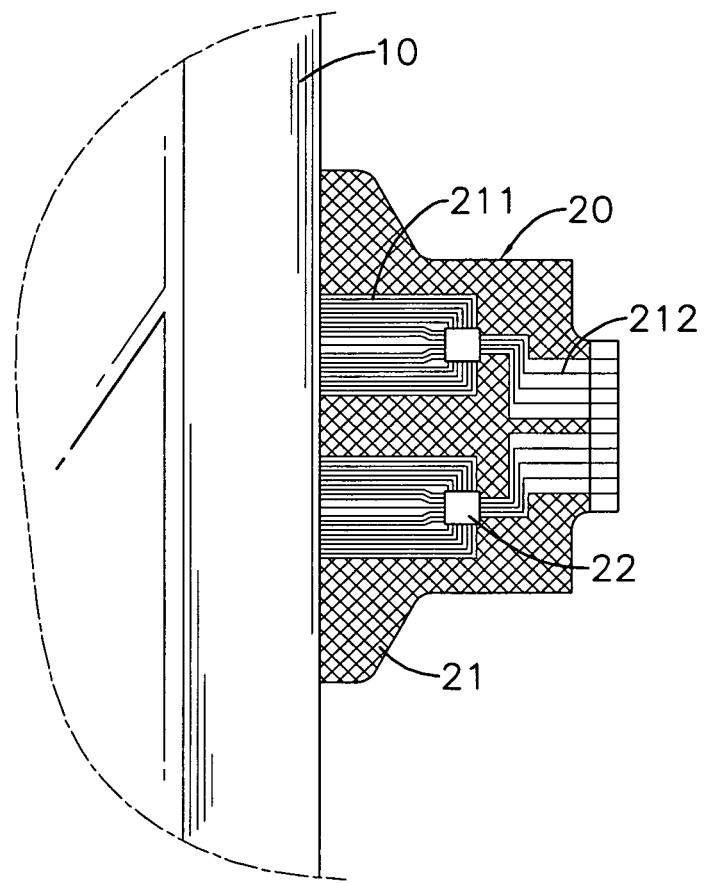
FIG. 2 is an enlarged front view of the projected capacitive touch panel in FIG. 1.

The X-axis conversion module 20 is mounted on a corresponding short side of the side frame of the touch panel 10 and is electrically connected with the X-axis signal transmission lines on the short side. The Y-axis conversion module 30 is mounted on a corresponding long side of the side frame of the touch panel 10 and is electrically connected with the Y-axis signal transmission lines on the long side. With reference to FIG. 2, the X-axis conversion module 20 has a flexible PCB 21. The flexible PCB 21 has at least one A/D converter 22, a plurality of first wires 211 and a plurality of second wires 212. The at least one A/D converter 22 is mounted on the flexible PCB 21. Each first wire 211 is formed on the flexible PCB 21 and connected between one of the X-axis signal transmission lines and an input terminal of one of the at least one A/D converter 22. Each second wire 212 is formed on the flexible PCB 21. One end of each second wire 212 is connected with an output terminal of a corresponding A/D converter 22. The other end of each second wire 212 is a contact.

Figure 3:
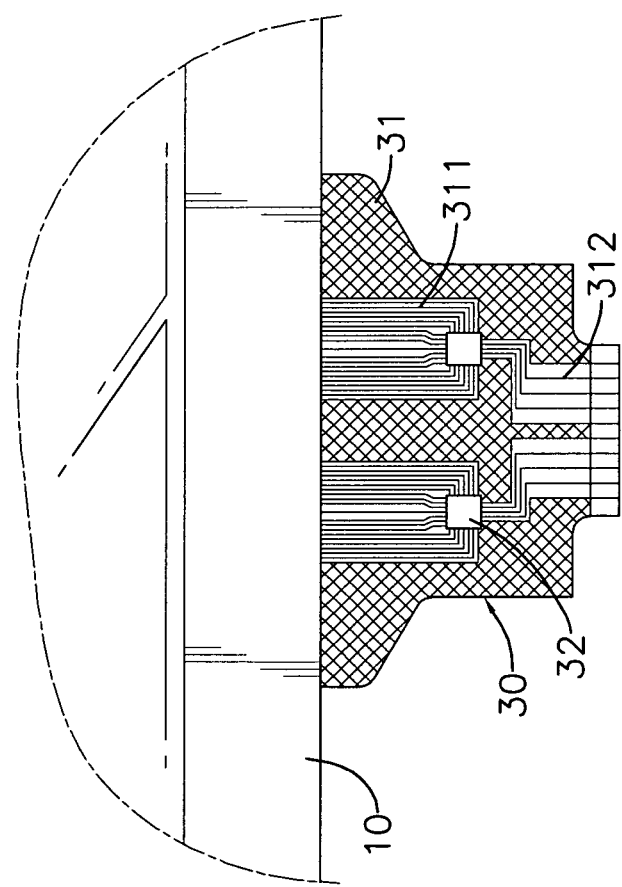
FIG. 3 is another enlarged front view of the projected capacitive touch panel in FIG. 1.

With reference to FIG. 3, similarly, the Y-axis conversion module 30 has a flexible PCB 31 and the flexible PCB 31 has at least one A/D converter 32, a plurality of first wires 311 and a plurality of second wires 312. The at least one A/D converter 32 is mounted on the flexible PCB 31. Each first wire 311 is formed on the flexible PCB 31 and connected between one of the Y-axis signal transmission lines and an input terminal of one of the at least one A/D converter 32. The second wire 312 is formed on the flexible PCB 31. One end of each second wire 312 is connected with an output terminal of a corresponding A/D converter 32. The other end of each wire 312 is a contact.

Figure 4:
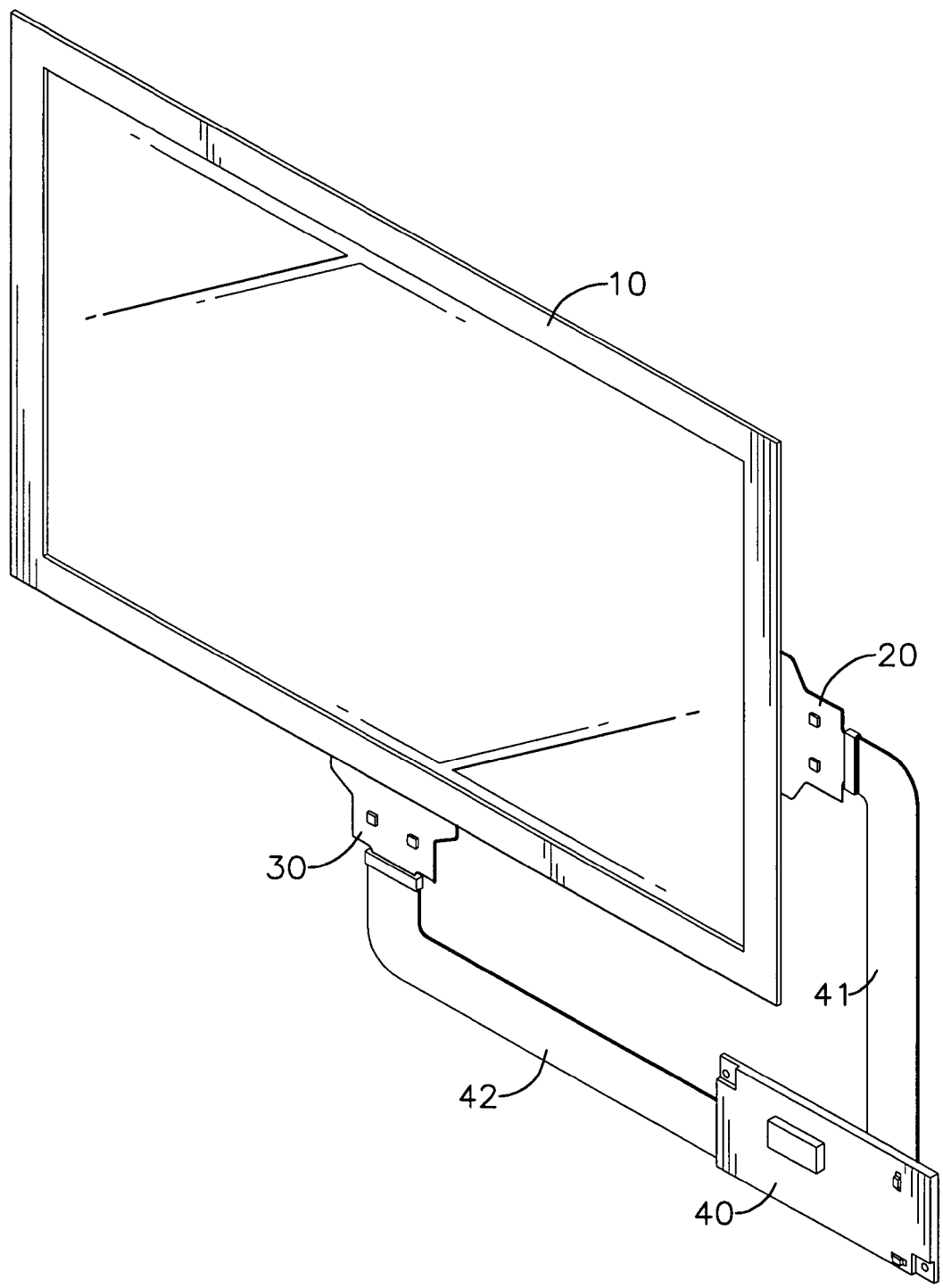
FIG. 4 is a perspective view of the projected capacitive touch panel connected with a distal control module in FIG. 1.

The contacts of the second wires 212, 312 of the flexible PCBs 21, 31 serve to connect to external or distal signals. A connector in connection with a transmission cable can be used to connect with the contacts and transmit the digital signals converted by the A/D converters 22, 32 to a distal end. With reference to FIG. 4, the X-axis conversion module 20 and the Y-axis conversion module 30 are respectively connected to a control module 40 at the distal end through flat cables 41, 42.

Figure 5:
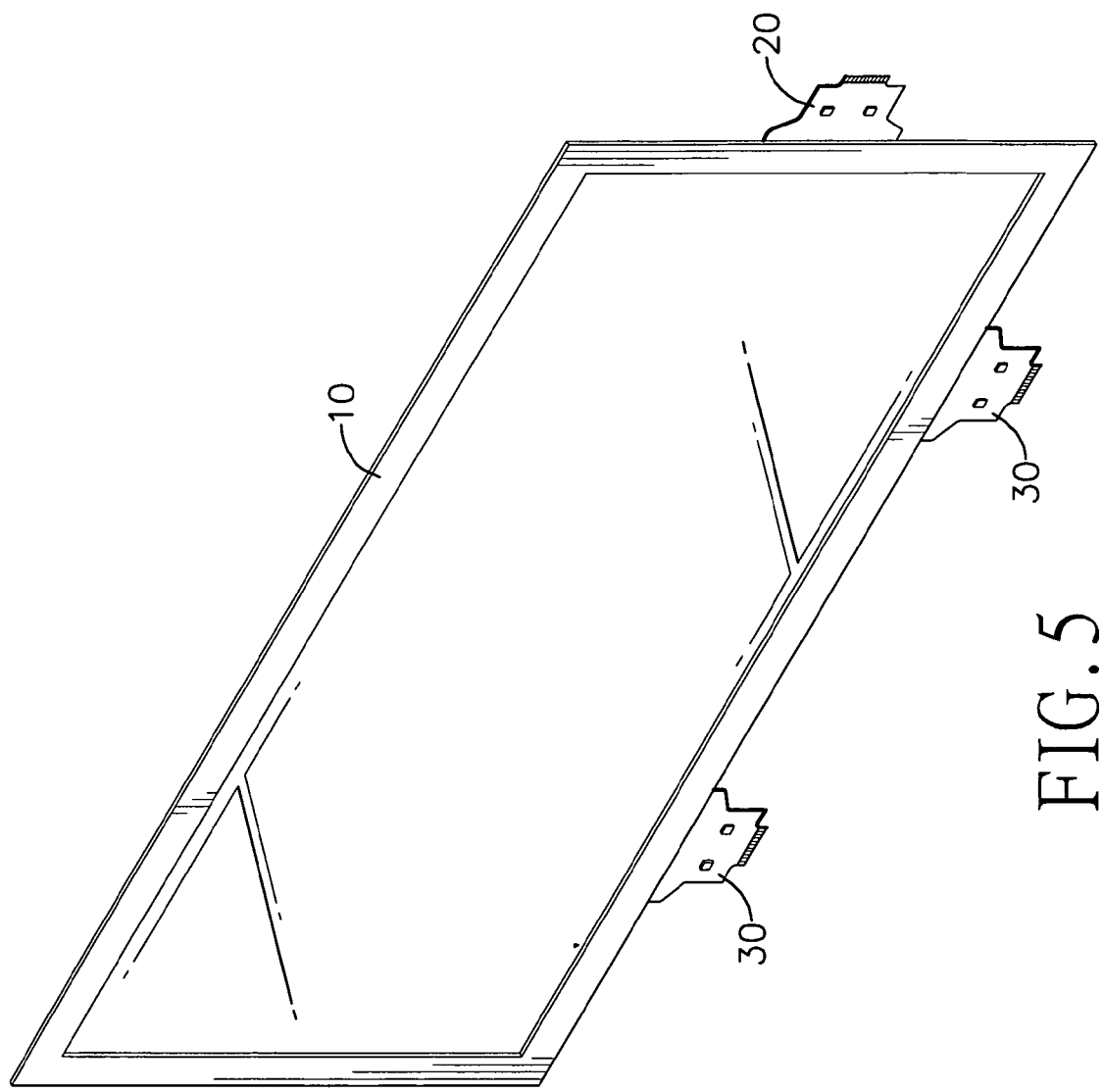
FIG. 5 is a perspective view of a second embodiment of a projected capacitive touch panel in accordance with the present invention.
Figure 6:
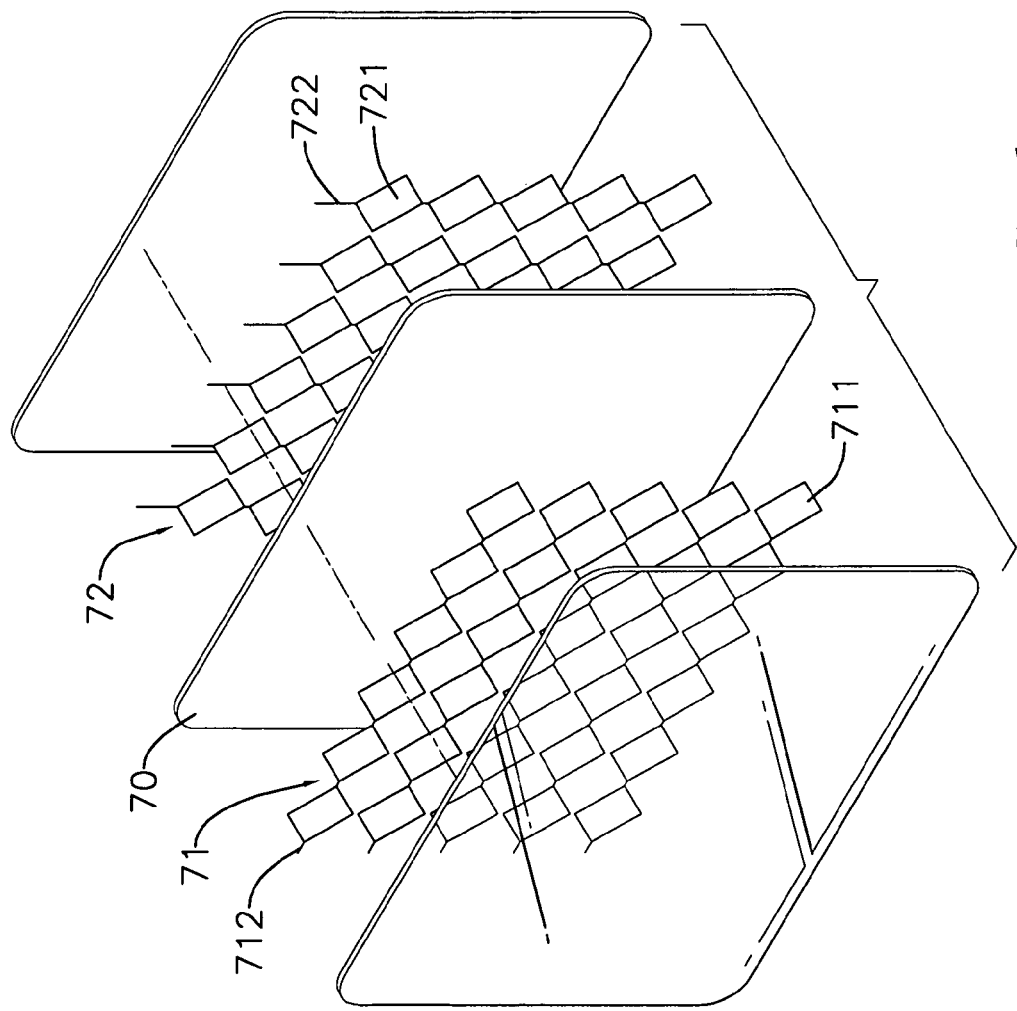
FIG. 6 is an exploded perspective view of a conventional projected capacitive touch panel.
Figure 7:
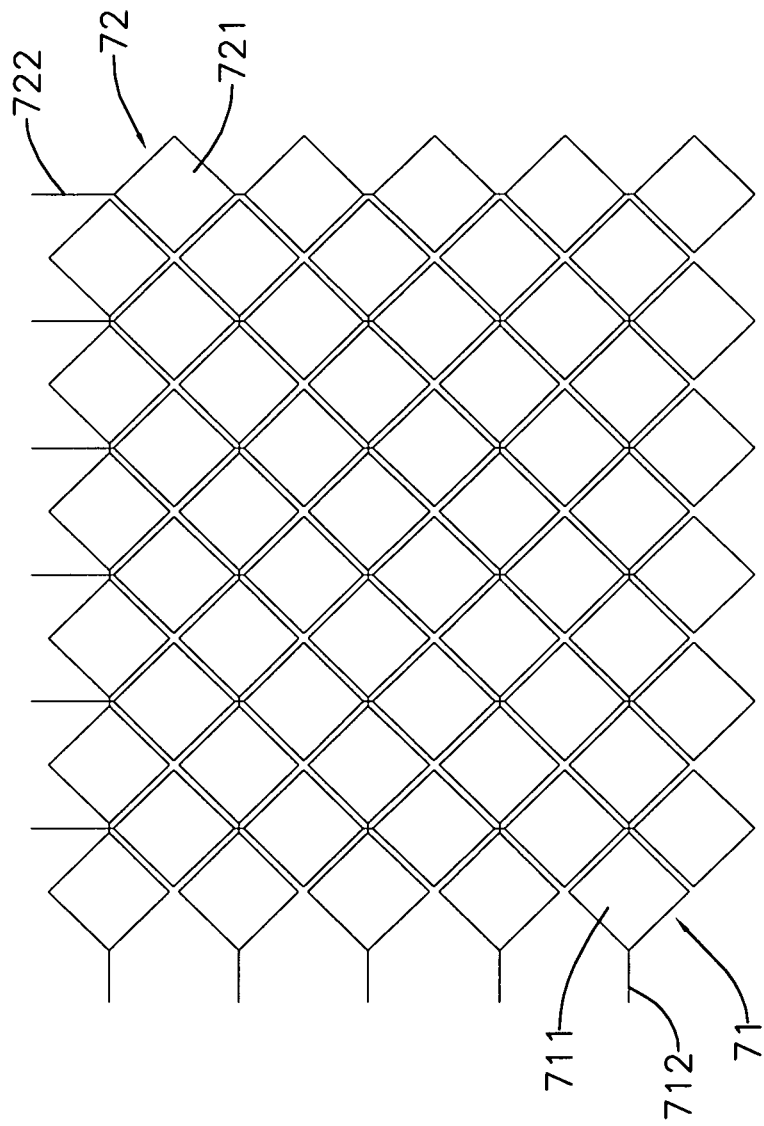
FIG. 7 is an enlarged front view of an X-axis electrode layer and a Y-axis electrode layer mutually overlapped in FIG. 6.
Figure 8:
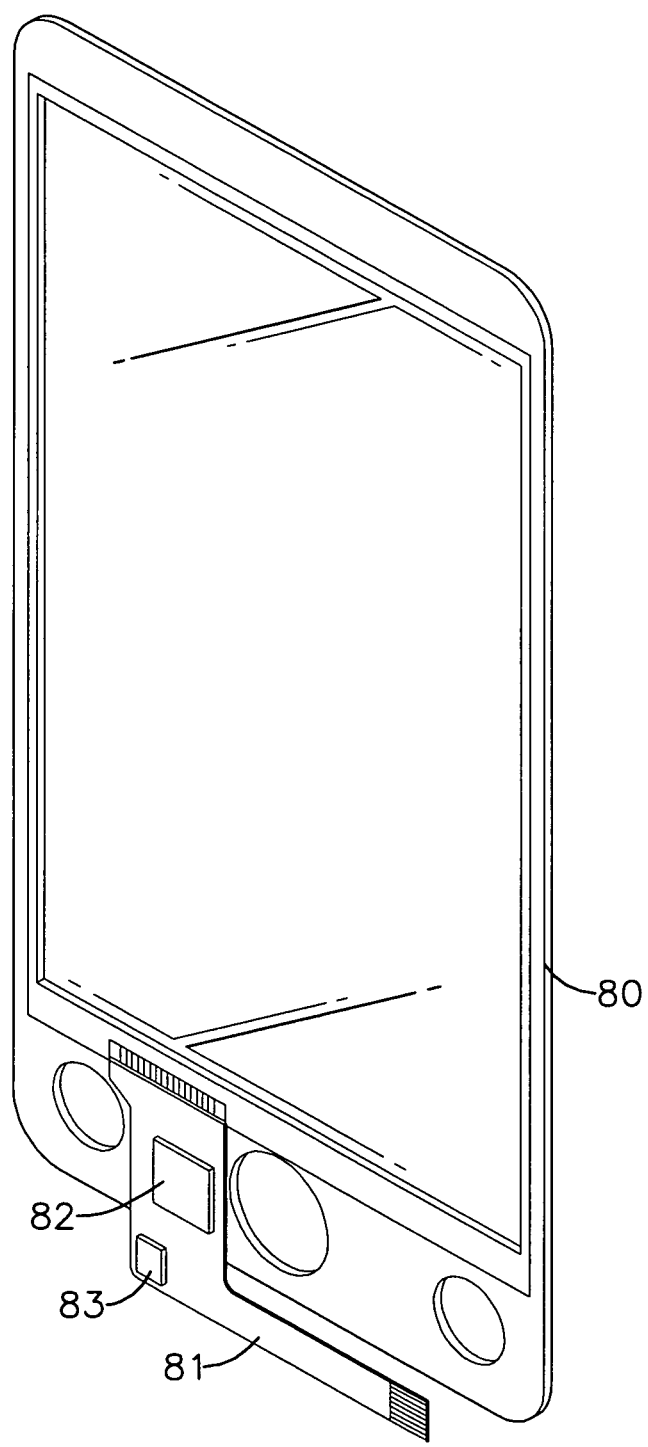
FIG. 8 is a perspective view of a projected capacitive touch panel of a smart phone.
Figure 9:
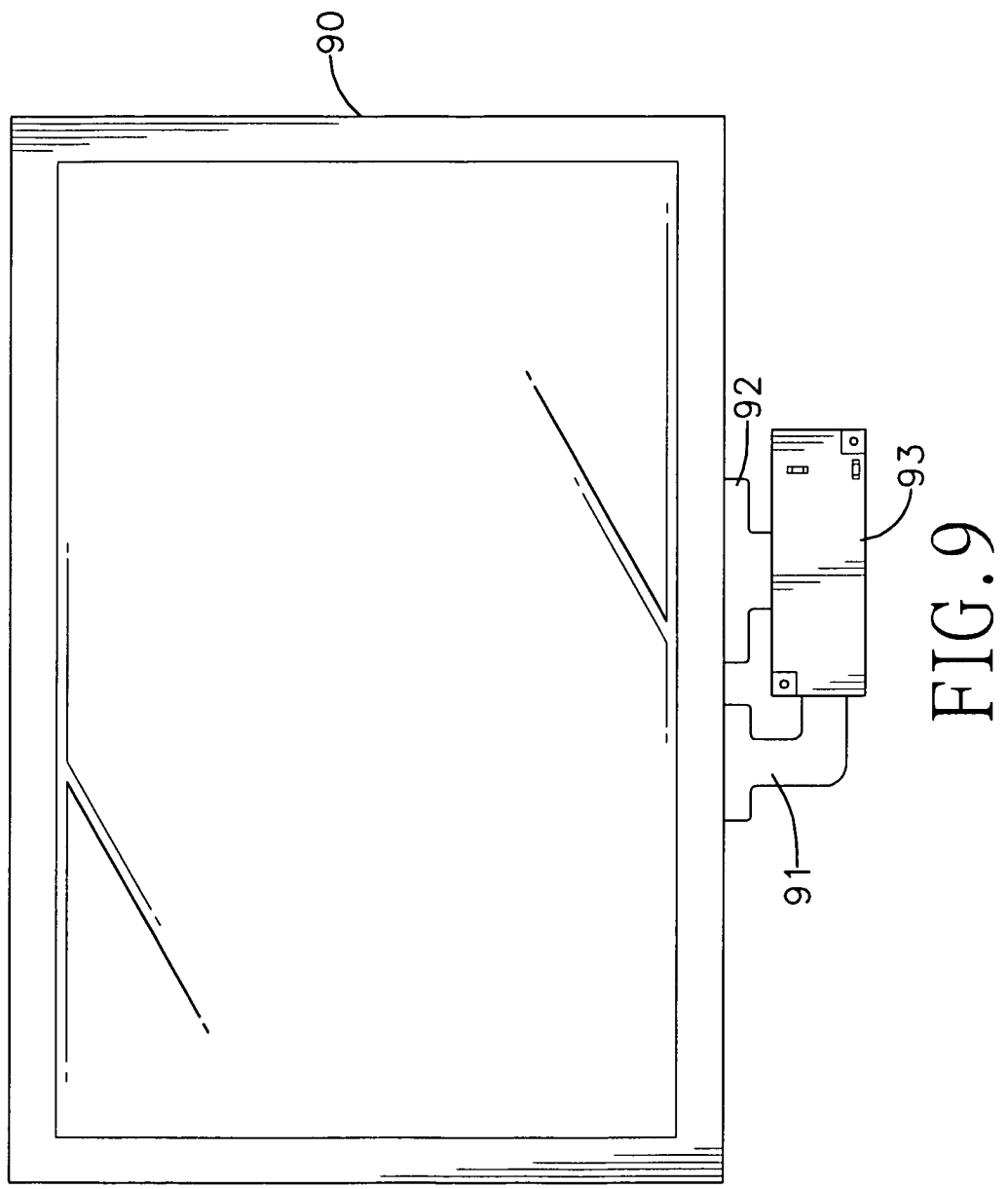
FIG. 9 is a front view of a conventional projected capacitive touch panel used by a display device.

With reference to FIG. 5, a second embodiment of a touch panel 10 is rectangular, and has a substrate, an X-axis electrode layer, a Y-axis electrode layer, an X-axis conversion module 20 and at least two Y-axis conversion modules 30. The substrate has a top, a bottom, two short sides and two long sides. The X-axis conversion module 20 is mounted on one of the short sides of the substrate. The two Y-axis conversion modules 30 are mounted on one of the long sides of the substrate. Similar to the approach in the first embodiment, the Y-axis signal transmission lines formed on the substrate and being adjacent to one of the long sides of the substrate can be electrically and respectively connected with the at least two Y-axis conversion modules 30. Instead of being connected to only one Y-axis conversion module 30, each Y-axis signal transmission line can be selectively connected with one of the at least two Y-axis conversion module 30, which is closer to the Y-axis signal transmission line, to shorten the wiring length of the Y-axis signal transmission line adjacent to the long side of the substrate.

Similarly, the X-axis signal transmission lines can be shortened by mounting at least two X-axis conversion modules 20 respectively and electrically connected with the X-axis signal transmission lines adjacent to one of the short sides of the substrate.

Accordingly, the X-axis conversion module 20 and the Y-axis conversion module 30 can be positioned and respectively connected with the X-axis signal transmission lines and the Y-axis signal transmission lines to ensure that the X-axis signal transmission lines and the Y-axis signal transmission lines are the shortest. The X-axis conversion module 20 and the Y-axis conversion module 30 only converting analog signals respectively transmitted through the X-axis signal transmission lines and the Y-axis signal transmission lines into digital signals are not involved with the job of computing and determining coordinates. The job of computing and determining coordinates is performed by an external control module 40 as shown in FIG. 4. The control module 40 has an input terminal, an output terminal and a controller. The controller receives the digital signals converted by the X-axis conversion module 20 and the Y-axis conversion module 30 through the input terminal, computes and determines X and Y coordinates in accordance with the digital signals, and outputs the X and Y coordinates through the output terminal and a RS-232 port or a USB port to a computer having a compatible port for further processing. The control module 40 can be located at a place being distal to both the X-axis conversion module 20 and the Y-axis conversion module 30, a place being proximal to the X-axis conversion module 20 while being distal to the Y-axis conversion module 30, or a place being distal to the X-axis conversion 20 module while being proximal to the Y-axis conversion module 30.

In sum, the present invention achieves the following objectives and advantages:

1. The control module can be flexibly mounted on any position on a side frame of a projected capacitive touch panel through which the signal transmission lines are wired to simplify the layout of the signal transmission lines.

2. Due to the shortened signal transmission lines incurring less interference, the analog signal transmitted through there are relatively stable. The digital signals converted from the analog signal and transmitted to the control module through other transmission medium are also stable.

3. Given multiple X-axis conversion modules and multiple Y-axis conversion modules, the width of the side frame of the touch panel can be effectively reduced and the size of the area dedicated to touch control can be relatively enlarged.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A projected capacitive touch panel, comprising:
a substrate that is transparent and has a top, a bottom and four sides;
an X-axis electrode layer formed on the top of the substrate and having a plurality of X-axis signal transmission lines formed on the top of the substrate and being adjacent to one of the four sides;
a Y-axis electrode layer formed on the bottom of the substrate and having a plurality of Y-axis signal transmission lines formed on the bottom of the substrate and being adjacent to one of the four sides, wherein the X-axis electrode layer and Y-axis electrode layer together define a touch control area, the X-axis signal transmission lines and the Y-axis signal transmission lines are formed on a peripheral area that is out of the touch control area, and the X-axis signal transmission lines are formed on the side that is adjacent to that of the Y-axis signal transmission lines are formed on;
an X-axis conversion module electrically connected with the X-axis signal transmission lines, the X-axis conversion module having:
an X-axis flexible printed circuit board; and
an X-axis analog-to-digital converter, mounted on the X-axis flexible printed circuit board and directly connected with the X-axis signal transmission lines, the X-axis analog-to-digital converter configured to convert analog signals transmitted from the X-axis signal transmission lines to digital signals and to output the digital signals, the X-axis analog-to-digital converter having an input terminal and an output terminal;
a Y-axis conversion module electrically connected with the Y-axis signal transmission lines and having:
a Y-axis flexible printed circuit board; and
a Y-axis analog-to-digital converter mounted on the Y-axis flexible printed circuit board and directly connected with the Y-axis signal transmission lines, the Y-axis analog-to-digital converter configured to convert analog signals transmitted from the Y-axis signal transmission lines to digital signals and to output the digital signals, the Y-axis analog-to-digital converter having an input terminal and an output terminal, wherein the X-axis conversion module is formed on the same side of the X-axis signal transmission lines, and the Y-axis conversion module is formed on the same side of the Y-axis signal transmission lines, and the side on which the X-axis conversion module is formed is adjacent to the side on which the Y-axis conversion module is formed; and
a control module directly connected to the X-axis conversion module through a first transmission cable without intervening functional components and directly connected to Y-axis conversion module through a second transmission cable without intervening functional components, the control module configured to compute and determine coordinate data from the digital signals, and to output the coordinate data, wherein the control module is external to the X-axis flexible printed circuit board and the Y-axis flexible printed circuit board, wherein the X-axis conversion module and the Y-axis conversion module are configured to convert analog signals into digital signals and are unable to compute or determine coordinates.

2. The projected capacitive touch panel as claimed in claim 1, wherein the X-axis conversion module further comprises:
a plurality of first X-axis wires, each first X-axis wire formed on the X-axis flexible printed circuit board of the X-axis conversion module and connected between one of the X-axis signal transmission lines and the input terminal of the X-axis analog-to-digital converter; and
a plurality of second X-axis wires, each second X-axis wire formed on the X-axis flexible printed circuit board of the X-axis conversion module, wherein one end of the second X-axis wire is connected with the output terminal of the X-axis analog-to-digital converter, and the other end of the second X-axis wire is a contact; and
wherein the Y-axis conversion module further comprises:
a plurality of first Y-axis wires, each first Y-axis wire formed on the Y-axis flexible printed circuit board of the Y-axis conversion module and connected between one of the Y-axis signal transmission lines and the input terminal of the Y-axis analog-to-digital converter; and
a plurality of second Y-axis wires, each second Y-axis wire formed on the Y-axis flexible printed circuit board of the Y-axis conversion module, wherein one end of each second Y-axis wire is connected with the output terminal of the Y-axis analog-to-digital converter, and the other end of the second Y-axis wire is a contact.

3. The projected capacitive touch panel as claimed in claim 1, wherein the substrate has two long sides and two short sides,
wherein the X-axis signal transmission lines are formed on the substrate and adjacent to one of the short sides of the substrate,
wherein the Y-axis signal transmission lines are formed on the substrate and adjacent to one of the long sides of the substrate,
wherein the X-axis conversion module is mounted on the short side of the substrate having the X-axis signal transmission lines and is electrically connected with the X-axis signal transmission lines, and
wherein the Y-axis conversion module is mounted on the long side of the substrate having the Y-axis signal transmission lines and is electrically connected with the Y-axis signal transmission lines.

4. The projected capacitive touch panel as claimed in claim 1, wherein a distance between the X-axis electrode layer and the X-axis conversion module is smaller than a distance between the X-axis conversion module and the control module, or wherein a distance between the Y-axis electrode layer and the Y-axis conversion module is smaller than a distance between the Y-axis conversion module and the control module.

5. The projected capacitive touch panel as claimed in claim 1, wherein the projected capacitive touch panel comprises a plurality of Y-axis conversion modules electrically connected with the Y-axis signal transmission lines, each the Y-axis conversion modules having a Y-axis flexible printed circuit board and at least one Y-axis analog-to-digital converter mounted on the Y-axis flexible printed circuit board and directly connected with the Y-axis signal transmission lines, each Y-axis conversion module being located adjacent the same side of the substrate as all other Y-axis conversion modules, and wherein the control module is directly connected to each Y-axis conversion module without any intervening functional components.

6. The projected capacitive touch panel as claimed in claim 5, wherein the projected capacitive touch panel comprises a plurality of X-axis conversion modules electrically connected with the X-axis signal transmission lines, each the X-axis conversion modules having an X-axis flexible printed circuit board and at least one X-axis analog-to-digital converter mounted on the X-axis flexible printed circuit board and directly connected with the X-axis signal transmission lines, each X-axis conversion module being located adjacent the same side of the substrate as all other X-axis conversion modules, and wherein the control module is directly connected to each X-axis conversion module without any intervening functional components.

7. A projected capacitive touch panel, comprising:
a substrate that is transparent and has a top, a bottom and four sides:
an X-axis electrode layer formed on the top of the substrate and having a plurality of X-axis signal transmission lines formed on the top of the substrate and being adjacent to one of the four sides;
a Y-axis electrode layer formed on the bottom of the substrate and having a plurality of Y-axis signal transmission lines formed on the bottom of the substrate and being adjacent to one of the four sides;
an X-axis conversion module electrically connected with the X-axis signal transmission lines, the X-axis conversion module having:
an X-axis flexible printed circuit board; and
an X-axis analog-to-digital converter mounted on the X-axis flexible printed circuit board and directly connected with the X-axis signal transmission lines, the X-axis analog-to-digital converter configured to convert analog signals transmitted from the X-axis signal transmission lines into digital signals and to output the digital signals, the X-axis analog-to-digital converter having an input terminal and an output terminal;
a Y-axis conversion module electrically connected with the Y-axis signal transmission lines and having:
a Y-axis flexible printed circuit board; and
a Y-axis analog-to-digital converter mounted on the Y-axis flexible printed circuit board and directly connected with the Y-axis signal transmission lines, the Y-axis analog-to-digital converter configured to convert analog signals transmitted from the Y-axis signal transmission lines into digital signals and to output the digital signals, the Y-axis analog-to-digital converter having an input terminal and an output terminal; and
a control module directly connected to the X-axis conversion module through a first transmission cable without intervening functional components and directly connected to Y-axis conversion module through a second transmission cable without intervening functional components, and having a controller configured to receive the digital signals outputted from the X-axis conversion module and Y-axis conversion module, to compute and determine coordinate data from the digital signals, and to output the coordinate data, wherein the control module is external to the X-axis flexible printed circuit board and the Y-axis flexible printed circuit board, wherein the X-axis conversion module and the Y-axis conversion module are configured to convert analog signals into digital signals and are unable to compute or determine coordinates.

8. The projected capacitive touch panel as claimed in claim 7, wherein the X-axis conversion module further comprises:
a plurality of first X-axis wires, each first X-axis wire formed on the X-axis flexible printed circuit board of the X-axis conversion module and connected between one of the X-axis signal transmission lines and the input terminal of the X-axis analog-to-digital converter; and
a plurality of second X-axis wires, each second X-axis wire formed on the X-axis flexible printed circuit board of the X-axis conversion module, wherein one end of the second X-axis wire is connected with the output terminal of the X-axis analog-to-digital converter, and the other end of the second X-axis wire is a contact;
the Y-axis conversion module further has:
a plurality of first Y-axis wires, each first Y-axis wire formed on the Y-axis flexible printed circuit board of the Y-axis conversion module and connected between one of the Y-axis signal transmission lines and the input terminal of the Y-axis analog-to-digital converter; and
a plurality of second Y-axis wires, each second Y-axis wire formed on the Y-axis flexible printed circuit board of the Y-axis conversion module, wherein one end of each second Y-axis wire is connected with the output terminal of the Y-axis analog-to-digital converter, and the other end of the second Y-axis wire is a contact.

9. The projected capacitive touch panel as claimed in claim 7, wherein the substrate has two long sides and two short sides,
wherein the X-axis signal transmission lines are formed on the substrate and adjacent to one of the short sides of the substrate,
wherein the Y-axis signal transmission lines are formed on the substrate and adjacent to one of the long sides of the substrate,
wherein the X-axis conversion module is mounted on the short side of the substrate having the X-axis signal transmission lines, and
wherein the Y-axis conversion module is mounted on the long side of the substrate having the Y-axis signal transmission lines.

10. The projected capacitive touch panel as claimed in claim 7, wherein a distance between the X-axis electrode layer and the X-axis conversion module is smaller than a distance between the X-axis conversion module and the control module, or wherein a distance between the Y-axis electrode layer and the Y-axis conversion module is smaller than a distance between the Y-axis conversion module and the control module.

11. A projected capacitive touch panel, comprising:
a substrate being transparent and having a first side and a second side that is adjacent to the first side;
an X-axis electrode layer formed on the substrate and having a plurality of X-axis signal transmission lines being adjacent to the first side;
a Y-axis electrode layer formed on the substrate and having a plurality of Y-axis signal transmission lines being adjacent to the second side;
an X-axis conversion module disposed at the first side of the substrate and electrically connected with the X-axis signal transmission lines, the axis conversion module having:
an X-axis flexible printed circuit board; and
an X-axis analog-to-digital converter, mounted on the X-axis flexible printed circuit board and directly connected with the X-axis signal transmission lines, the X-axis analog-to-digital converter configured to convert analog signals transmitted from the X-axis signal transmission lines to digital signals and to output the digital signals, the X-axis analog-to-digital converter having an input terminal and an output terminal;
a Y-axis conversion module electrically disposed at the second side of the substrate and connected with the Y-axis signal transmission lines and having:
a Y-axis flexible printed circuit board; and
a Y-axis analog-to-digital converter mounted on the Y-axis flexible printed circuit board and directly connected with the Y-axis signal transmission lines, the Y-axis analog-to-digital converter configured to convert analog signals transmitted from the Y-axis signal transmission lines to digital signals and to output the digital signals, the Y-axis analog-to-digital converter having an input terminal and an output terminal; and
a control module directly connected to the X-axis conversion module through a first transmission cable without intervening functional components and directly connected to Y-axis conversion module through a second transmission cable without intervening functional components, the control module having a controller configured to receive the digital signals outputted from the X-axis conversion module and the Y-axis conversion module, to compute and determine coordinate data from the digital signals, and to output the coordinate data, wherein the control module is external to the X-axis flexible printed circuit board and the Y-axis flexible printed circuit board, wherein the X-axis conversion module and the Y-axis conversion module are configured to convert analog signals into digital signals and are unable to compute or determine coordinates.

12. The projected capacitive touch panel as claimed in claim 11, wherein
the X-axis conversion module further comprises:
a plurality of first X-axis wires, each first X-axis wire formed on the X-axis flexible printed circuit board of the X-axis conversion module and connected between one of the X-axis signal transmission lines and the input terminal of the X-axis analog-to-digital converter; and
a plurality of second X-axis wires, each second X-axis wire formed on the X-axis flexible printed circuit board of the X-axis conversion module, wherein one end of the second X-axis wire is connected with the output terminal of the X-axis analog-to-digital converter, and the other end of the second X-axis wire is a contact;
the Y-axis conversion module further comprises:
a plurality of first Y-axis wires, each first Y-axis wire formed on the Y-axis flexible printed circuit board of the Y-axis conversion module and connected between one of the Y-axis signal transmission lines and the input terminal of the Y-axis analog-to-digital converter; and
a plurality of second Y-axis wires, each second Y-axis wire formed on the Y-axis flexible printed circuit board of the Y-axis conversion module, wherein one end of each second Y-axis wire is connected with the output terminal of the Y-axis analog-to-digital converter, and the other end of the second Y-axis wire is a contact.

13. The projected capacitive touch panel as claimed in claim 11, wherein
the X-axis conversion module is mounted on the first side of the substrate and is electrically connected with the X-axis signal transmission lines, and
the Y-axis conversion module is mounted on the second side of the substrate and is electrically connected with the Y-axis signal transmission lines.

14. The projected capacitive touch panel as claimed in claim 11, wherein
the X-axis electrode layer has a plurality of X-axis electrodes arranged in rows, wherein the X-axis electrodes on a same row are mutually connected, and
the Y-axis electrode layer has a plurality of Y-axis electrodes arranged in columns, wherein the Y-axis electrodes on a same column are mutually connected.

15. The projected capacitive touch panel as claimed in claim 11, wherein a distance between the X-axis electrode layer and the X-axis conversion module is smaller than a distance between the X-axis conversion module and the control module, or wherein a distance between the Y-axis electrode layer and the Y-axis conversion module is smaller than a distance between the Y-axis conversion module and the control module.

16. A projected capacitive touch panel, comprising:
a substrate that is transparent and has a first side and a second side adjacent to the first side;
an X-axis electrode layer formed on the substrate and having a plurality of X-axis signal transmission lines being adjacent to the first side;
a Y-axis electrode layer formed on the substrate and having a plurality of Y-axis signal transmission lines being adjacent to the second side;
an X-axis conversion module mounted on the first side of the substrate and electrically connected with the X-axis signal transmission lines, the X-axis conversion module comprising:
an X-axis flexible printed circuit board; and
an X-axis analog-to-digital converter, mounted on the X-axis flexible printed circuit board and directly connected with the X-axis signal transmission lines, the X-axis analog-to-digital converter configured to convert analog signals transmitted from the X-axis signal transmission lines to digital signals and to output the digital signals;
an Y-axis conversion module mounted on the second side of the substrate and electrically connected with the Y-axis signal transmission lines, Y-axis conversion module comprising:
a Y-axis flexible printed circuit board; and
a Y-axis analog-to-digital converter mounted on the Y-axis flexible printed circuit board directly connected with the Y-axis signal transmission lines, the Y-axis analog-to-digital converter configured to convert analog signals transmitted from the Y-axis signal transmission lines to digital signals and to output the digital signals; and
a control module directly connected to the X-axis conversion module through a first transmission cable without intervening functional components and directly connected to Y-axis conversion module through a second transmission cable without intervening functional components, the control module having a controller configured to receive the digital signals outputted from the X-axis conversion module and the Y-axis conversion module, to compute and determine coordinate data from the digital signals, and to output the coordinate data, wherein the control module is external to the X-axis flexible printed circuit board and the Y-axis flexible printed circuit board, wherein the X-axis conversion module and the Y-axis conversion module are configured to convert analog signals into digital signals and are unable to compute or determine coordinates.

17. The projected capacitive touch panel as claimed in claim 16, wherein
the X-axis analog-to-digital converter has an input terminal and an output terminal, and
the Y-axis analog-to-digital converter has an input terminal and an output terminal.

18. The projected capacitive touch panel as claimed in claim 17, wherein
the X-axis conversion module further comprises:
a plurality of first X-axis wires, each first X-axis wire formed on the X-axis flexible printed circuit board of the X-axis conversion module and connected between the X-axis signal transmission lines and the input terminal of the X-axis analog-to-digital converter; and
a plurality of second X-axis wires, each second X-axis wire formed on the X-axis flexible printed circuit board of the X-axis conversion module, wherein one end of the second X-axis wire is connected with the output terminal of the X-axis analog-to-digital converter, and the other end of the second X-axis wire is a contact;
the Y-axis conversion module further comprises:
a plurality of first Y-axis wires, each first Y-axis wire formed on the Y-axis flexible printed circuit board of the Y-axis conversion module and connected between one of the Y-axis signal transmission lines and the input terminal of the Y-axis analog-to-digital converter; and
a plurality of second Y-axis wires, each second Y-axis wire formed on the Y-axis flexible printed circuit board of the Y-axis conversion module, wherein one end of each second Y-axis wire is connected with the output terminal of the Y-axis analog-to-digital converter, and the other end of the second Y-axis wire is a contact.

19. The projected capacitive touch panel as claimed in claim 16, wherein
the X-axis electrode layer has a plurality of X-axis electrodes arranged in rows, the X-axis electrodes on a same row being mutually connected, and
the Y-axis electrode layer has a plurality of Y-axis electrodes arranged in rows, the Y-axis electrodes on a same column being mutually connected.

20. The projected capacitive touch panel as claimed in claim 16, wherein a distance between the X-axis electrode layer and the X-axis conversion module is smaller than a distance between the X-axis conversion module and the control module, or wherein a distance between the Y-axis electrode layer and the Y-axis conversion module is smaller than a distance between Y-axis conversion module and the control module.

\* \* \* \* \*